United States Patent
Du et al.

(10) Patent No.: US 8,977,029 B2
(45) Date of Patent: Mar. 10, 2015

(54) METHOD AND SYSTEM FOR MULTI-ATLAS SEGMENTATION OF BRAIN COMPUTED TOMOGRAPHY IMAGE DATA

(71) Applicants: Kaifang Du, Iowa City, IA (US); Li Zhang, Skillman, NJ (US); Tony Nguyen, Villiers sur Marne (FR); Vincent Ordy, Plainsboro, NJ (US); Heinz Fichte, Herzogenaurach (DE); Hendrik Ditt, Nürnberg (DE)

(72) Inventors: Kaifang Du, Iowa City, IA (US); Li Zhang, Skillman, NJ (US); Tony Nguyen, Villiers sur Marne (FR); Vincent Ordy, Plainsboro, NJ (US); Heinz Fichte, Herzogenaurach (DE); Hendrik Ditt, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 13/974,481

(22) Filed: Aug. 23, 2013

(65) Prior Publication Data
US 2014/0056501 A1 Feb. 27, 2014

Related U.S. Application Data

(60) Provisional application No. 61/692,816, filed on Aug. 24, 2012.

(51) Int. Cl.
 *G06K 9/00* (2006.01)
 *G06T 7/00* (2006.01)
(52) U.S. Cl.
 CPC ............. *G06T 7/0079* (2013.01); *G06T 7/0081* (2013.01); *G06T 7/0097* (2013.01); *G06T 2200/04* (2013.01); *G06T 2207/10081* (2013.01); *G06T 2207/20128* (2013.01); *G06T 2207/20224* (2013.01); *G06T 2207/30016* (2013.01); *G06T 2207/30101* (2013.01)
 USPC .......................................................... 382/131
(58) Field of Classification Search
 CPC ............................................. G06T 2207/20128
 See application file for complete search history.

(56) References Cited

U.S. PATENT DOCUMENTS

| | | | |
|---|---|---|---|
| 8,019,142 B2 | 9/2011 | Nowinski et al. | |
| 8,160,357 B2 | 4/2012 | Akinyemi et al. | |
| 8,411,950 B2 | 4/2013 | Akinyemi et al. | |
| 2008/0188741 A1* | 8/2008 | Mallya et al. | 600/426 |
| 2012/0027272 A1 | 2/2012 | Akinyemi et al. | |
| 2012/0177263 A1 | 7/2012 | Akinyemi et al. | |
| 2012/0246181 A1 | 9/2012 | Nowinski et al. | |
| 2013/0123607 A1* | 5/2013 | Leuthardt et al. | 600/410 |
| 2013/0279772 A1 | 10/2013 | Stedele | |
| 2014/0307936 A1* | 10/2014 | Dore et al. | 382/131 |

\* cited by examiner

*Primary Examiner* — Atiba O Fitzpatrick (57) ABSTRACT

A method and system for multi-atlas segmentation brain structures and vessel territories in a brain computed tomography (CT) image is disclosed. Each of a plurality of atlas images is individually registered to an input brain CT image, resulting in a plurality of warped atlas images. A region of interest is defined based on labeled brain structures in each of the plurality of warped atlas images. For each atlas image, a respective sum of squared difference (SSD) value is calculated between the corresponding warped atlas image and the brain CT image within the region of interest defined for the corresponding warped atlas image. A number of the atlas images are selected based on the SSD values calculated for the atlas images. The brain structures and vessel territories are segmented in the brain CT image using only the selected atlas images.

28 Claims, 9 Drawing Sheets

METHOD AND SYSTEM FOR MULTI-ATLAS SEGMENTATION OF BRAIN COMPUTED TOMOGRAPHY IMAGE DATA

This application claims the benefit of U.S. Provisional Application No. 61/692,816, filed Aug. 24, 2012, the disclosure of which is herein incorporated by reference.

BACKGROUND OF THE INVENTION

The present invention relates to segmentation of brain structures in medical image data, and more particularly, to a method and system for multi-atlas segmentation of brain structures and cerebral vessel territories in brain computed tomography (CT) image data.

Brain CT imaging plays an important role in clinical disease diagnosis. In particular, detection of morphological signatures in brain CT images provides useful information for diagnosing brain disease. For example, ischaemic strokes are due to an interruption in the blood supply to a certain area of the brain, which leads to ischaemia, infarction, and eventual tissue necrosis. The changes can be interpreted and localized in brain CT images for early diagnosis. The quantitative analysis of brain CT images typically requires segmentation of brain structures and vessel territories. Reliable and accurate segmentation of vessel territories are desirable to help localize cerebrallesion in brain CT images in order to diagnose cerebral infarction. Although there have been many studies on segmentation of brain magnetic resonance imaging (MRI) data, vessel territory segmentation in CT image data is far less studied. Accordingly, a reliable and accurate method for segmentation of vessel territories in brain CT image data is desirable.

BRIEF SUMMARY OF THE INVENTION

The present invention provides a method and system for multi-atlas segmentation of brain structures and vessel territories in brain computed tomography (CT) image data.

In one embodiment of the present invention, a brain CT image of a patient is received. Each of a plurality of atlas images is individually registered to the brain CT image, resulting in a plurality of warped atlas images. A region of interest is defined in each of the plurality of warped atlas images based on labeled brain structures in each of the plurality of warped atlas images. For each of the plurality of atlas images, a respective sum of squared difference (SSD) value is calculated between a corresponding warped atlas image and the brain CT image within the respective region of interest defined for the corresponding warped atlas image. A number of the plurality atlas images are selected based on the respective SSD value calculated for each of the plurality of atlas images. Brain structures and vessel territories in the brain CT image are segmented using the selected number of the plurality of atlas images.

In another embodiment of the present invention, a plurality of atlas images are retrieved from a database. Each of the plurality of atlas images is sequentially assigned to be a query image. For each atlas image assigned to be the query image, each of the remaining atlas images of the plurality of atlas images is registered to the query image, resulting in a plurality of warped atlas images, and the remaining atlas images of the plurality of atlas images are ranked based on a sum of squared difference (SSD) value calculated between the warped atlas image corresponding to each remaining atlas image and the query image. A final ranking of the plurality of atlas images is determined based on the rankings of the remaining atlas images for each atlas image assigned to be the query image. A number of top ranked atlas images from the plurality of atlas images are selected based on the final ranking of the plurality of atlas images. A brain CT image of a patient is received, and brain structures and vessel territories in the brain CT image are segmented by multi-atlas segmentation using the selected number of top ranked atlas images.

These and other advantages of the invention will be apparent to those of ordinary skill in the art by reference to the following detailed description and the accompanying drawings.

DETAILED DESCRIPTION

The present invention relates to multi-atlas segmentation of brain structures and cerebral vessel territories in brain computed tomography (CT) image data. Embodiments of the present invention are described herein to give a visual understanding of the methods of segmenting brain structures and cerebral vessel territories. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

As used herein, an atlas is defined as the pairing of a structured CT scan and a corresponding manual segmentation. Atlas-based segmentation is a commonly used technique to segment image data. An intensity moving image is registered non-rigidly to a fixed image and the acquired transformation is used to propagate labels of the moving image to the space of the fixed image. The segmentation accuracy can be improved considerably by multi-atlas segmentation with learning-based label fusion. In multi-atlas segmentation, several different atlases are registered to the query image, and the labels from the atlases are fused to generate an estimated segmentation. Multi-atlas segmentation typically achieves better accuracy than single atlas segmentation. However, a drawback of multi-atlas segmentation is that it is computationally expensive and time consuming.

In various embodiments of the present invention, instead of computing the whole atlas population, a smart atlas selection strategy is used to improve the segmentation process by decreasing the computation time without affecting the accuracy of the segmentation results. In multi-atlas segmentation, such as multi-atlas segmentation using majority voting label fusion, the aim of embodiments of the present invention is to keep the number of atlases as low as possible. Embodiments of the present invention establish what is the least number of atlases to be used to achieve or even exceed the accuracy of the whole atlas population. Embodiments of the present invention also integrate image similarity information into the atlas selection to further improve the segmentation accuracy.

Figure 1:
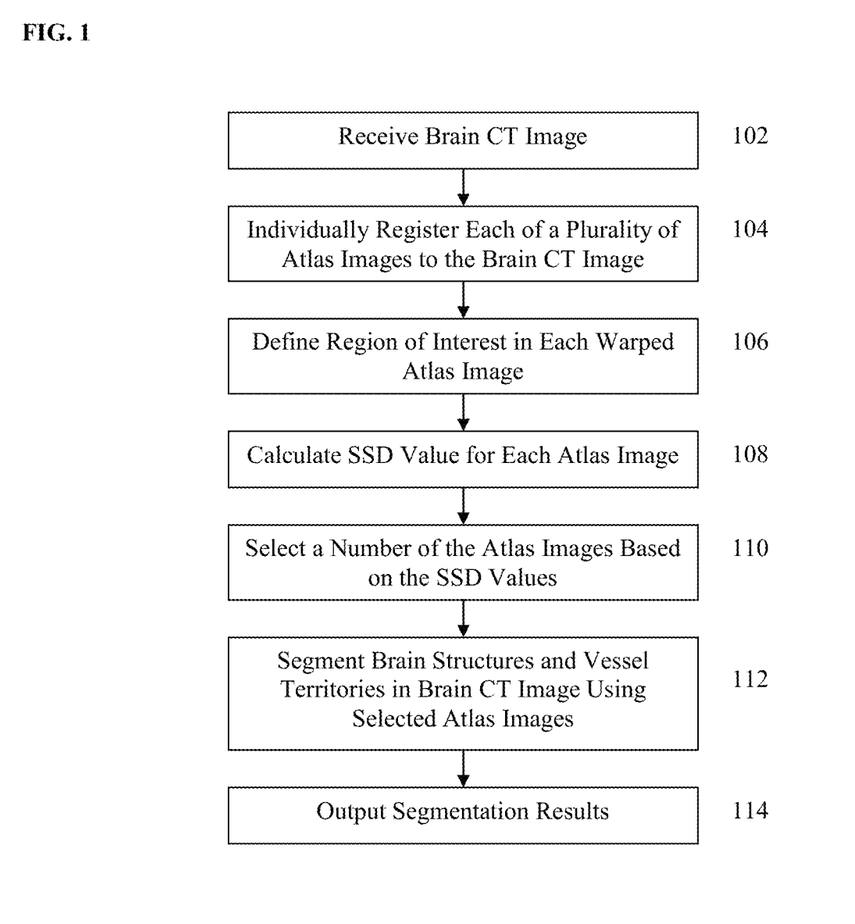
FIG. 1 illustrates a method of segmenting brain structures and vessel territories in a brain CT image according to an embodiment of the present invention.

FIG. 1 illustrates a method of segmenting brain structures and vessel territories in a brain CT image according to an embodiment of the present invention. The method of FIG. 1 transforms image data representing the anatomy of a patient's brain to segment brain structures and vessel territories in the image data. The method of FIG. 1 utilizes an "online" atlas selection strategy that selects the best atlases to use to segment an input brain CT image based on image similarity information between the atlases and the input brain CT image.

Referring to FIG. 1, at step 102, a brain CT image of a patient is received. The brain CT image can be a 3D CT volume of the patient's brain. The brain CT image can be received directly from a CT scanner or can be received by loading the brain CT image from a memory or storage of a computer system. In a possible implementation, the brain CT image can be received after undergoing a pre-processing operation to remove the skull bone from the brain CT image.

At step 104, each of a plurality of atlas images is individually registered to the brain CT image. The atlas images can be stored in a database. Each atlas image is a pairing of structured CT scan and a manual segmentation of brain structures and vessel territories in the CT scan. The voxels of each atlas image are encoded with labels corresponding to the manual segmentation of the brain structures and the vessel territories. The brain structures of the caudate, putamen, thalamus, and internal capsule can be labeled in each atlas image. Vessel territories associated with various cerebral arteries can also be labeled in each atlas image. For each cerebral artery, the associated vessel territory is a region of the brain that is supplied blood by that cerebral artery.

Before registration, all of the images (i.e., the received brain CT image and the atlas images) are pre-processed to remove the skull bone. This pre-processing operation is well known to those skilled in the art. In order to register an atlas image to the brain CT image, rigid registration is first performed to roughly align the two images. The rigid registration includes a scaling term that compensates for differences in image orientation, image size, and physical coverage between the atlas image and the brain CT image. Once the atlas image and the brain CT image are roughly aligned by the rigid registration, non-rigid registration is performed to deform regions within the atlas image to maximize an image similarity measure or minimize and error measure between the two images. Techniques for performing the rigid and non-rigid registrations are well known to those skilled in the art. To help in atlas selection, image similarity can be calculated in each registration pair as an estimate of image correspondence. The registration of each atlas image with the brain CT image calculates a deformation field for each atlas image that warps each atlas image to the space of the brain CT image, resulting in a plurality of warped atlas images. The deformation field for each atlas image also warps the labels of the brain structures and the vessel territories associated with each atlas to the space of the brain CT image.

In an advantageous embodiment, the registration of each atlas image with the brain CT image can be performed at a reduced resolution. In particular, reduced resolution images can be generated for the brain CT image and for each of the atlas images, and the reduced resolution image of each of the atlas images can be registered to the reduced resolution image of the brain CT image. In this embodiment, steps 106-110 are all performed at the reduced resolution. Accordingly, the atlas selection can be performed a low resolution, thus reducing computational costs, before the segmentation of step 112 is performed at a high resolution (e.g., the original resolution of the brain CT image) to increase accuracy of the segmentation.

Figure 2:
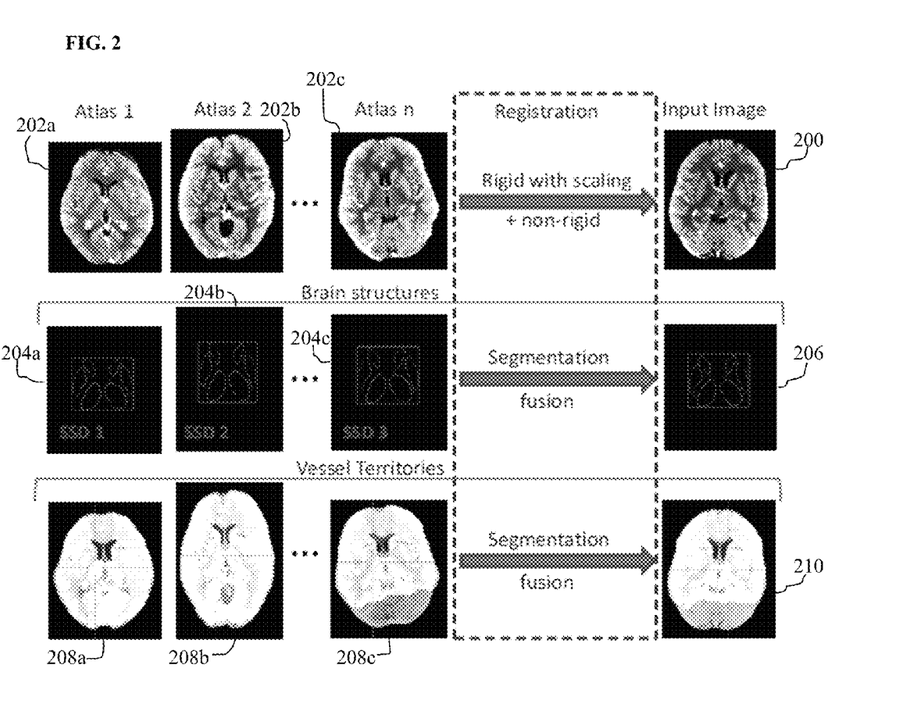
FIG. 2 illustrates multi-atlas segmentation of an input image using a number of selected atlas images according to an embodiment of the present invention.

At step 106, a region of interest is defined in each warped atlas image based on the labeled brain structures in each warped atlas image. According to an advantageous implementation, the region of interest (ROI) is defined in a warped atlas image as the minimum bounding box that contains all of the labeled brain structures in that warped atlas image. In particular, the ROI for a warped atlas image can be the minimum bounding box that contains all of the labeled brains structures of the caudate, the putamen, the thalamus, and the internal capsule in the warped atlas image. For example, ROIs 205a, 205b, and 205c are shown in FIG. 2, which is described in greater detail below.

At step 108, a sum of square difference (SSD) value is calculated for each of the atlas images. In particular, for each atlas image, the SSD value is calculated by calculating the SSD between the corresponding warped atlas image and the brain CT image within the ROI defined for the warped atlas image. That is, the ROI in each warped atlas image is compared to the same region in the brain CT image. For each voxel in the ROI of the warped atlas image and the corresponding region of the brain CT image, an intensity difference is calculated. These intensity differences are squared and the sum of the squared intensity differences over the ROI is calculated. This results in a respective SSD value for each of the atlas images.

At step 110, a number of the atlas images are selected based on the SSD values calculated for the atlas images. The SSD values calculated for the atlas images are used as the atlas selection criteria. The atlas images are ranked in order based on the SSD values from a lowest SSD value to a highest SSD value. Since the ROI of each warped atlas image is defined based on the brain structures and the SSD value for each atlas image is calculated within the ROI, the atlas image having the lowest SSD is the atlas image that is most similar to the brain CT image in a region in which the brain structures are location. Once the atlas images are ranked based on the SSD values, a number of top ranked atlas images (i.e., atlas images with lowest SSD values) are selected to perform segmentation of the brain structures and vessel territories in the brain CT image.

The number of top ranked atlas images selected can depend on a type of segmentation and label fusion to be performed using the selected atlas images. In an exemplary embodiment, a predetermined number (e.g., 5) top ranked atlas images are selected to perform multi-atlas segmentation of the brain CT image. In an advantageous implementation the predetermined number of top ranked atlas images is less than a total number of atlas images available. Segmentations from several atlases can be fused or combined to provide a consensus segmentation estimate for a query image, such as the brain CT image. Such multi-atlas segmentation approaches reduce the effect of errors associated with individual propagated atlases. Registration error of one atlas is less likely to affect the final segmentation when combined with other atlases. The fusion of labels takes place at the voxel level and can be achieved using different label fusion techniques. In an advantageous implementation, a majority voting (MV) label fusion technique is used. In this case, the five top ranked atlas images may be selected for the multi-atlas segmentation using the majority voting label fusion, but the present invention is not limited thereto. In alternate implementations, other label fusion techniques, such as the Staple label fusion technique, may be used and the number of atlas images to select may be set based on which fusion technique is used.

In another exemplary embodiment, a single top ranked atlas image (i.e., the atlas image having the lowest SSD value) may be selected to perform the segmentation. In this case, the top ranked atlas image can be considered to be the most similar atlas image to the brain CT image, and the top ranked atlas is selected to segment the brain structures and vessel territories in the brain CT image without contribution from the other atlas images.

At step 112, brain structures and vessel territories in the brain CT image are segmented using the selected atlas images. As described above, steps 104-106 may be performed at a reduced resolution in order to reduce computational costs when selecting which atlas images to use to segment the brain CT image. Once the number of atlas images are selected, the selected atlas images are used to segment in structures and vessel territories in the brain CT image at an original (high) resolution of the brain CT image. The brain structures segmented in the brain CT image can include the caudate, putamen, thalamus, and internal capsule. The vessel territories segmented in the brain CT image include a plurality of vessel territories corresponding to various cerebral arteries, where each vessel territory corresponds to a region of the brain that is supplied blood by a respective one of the cerebral arteries. The brain structures and vessel territories in the brain CT image are segmented by warping the brain structure labels and the vessel territory labels in each of the selected atlas images to the space of the brain CT image and fusing the labels from the selected atlas images to determine labels for the brain CT image.

In an exemplary embodiment, the brain structures and vessel territories in the brain CT image are segmented by multi-atlas segmentation using the selected atlas images. In this case, multiple (e.g., 5) atlas images are selected in step 110. FIG. 2 illustrates multi-atlas segmentation of an input image using a number of selected atlas images according to an embodiment of the present invention. As illustrated in FIG. 2, a number of atlas images Atlas 1 (202a), Atlas 2 (202b), . . . , Atlas n (202c) are selected. The atlas images 202a-202c are each registered with an input image 200 using a rigid registration with scaling enabled and a non-rigid registration. This results in a deformation field for each atlas image 202a-202c that warps each atlas image 202a-202c to a space of the input image 200. Each atlas image 202a-202c includes brain structure labels 204a-204c. As described above a region of interest 205a-205c can be defined as a minimal bounding box that contains the labeled brain structures. The brain structure labels 204a-204c of each atlas image 202a-202c are warped using the deformation field resulting from the registration the atlas image 202a-202c to the input image 200 to provide separate brain structure segmentation estimates in the space of the input image 200. Once all of the brain structure labels 204a-204c are warped to the space of the input image 200, the warped brain structure labels are fused or combined to determine brain structure labels 206 for the input image 200. Each atlas image 202a-202c includes vessel territory labels 208a-208c. The vessel territory labels 208a-208c of each atlas image 202a-202c are warped using the deformation field resulting from the registration the atlas image 202a-202c to the input image 200 to provide separate vessel territory segmentation estimates in the space of the input image 200. Once all of the vessel territory labels 208a-208c are warped to the space of the input image 200, the warped vessel territory labels are fused or combined to determine vessel territory labels 210 for the input image 200.

In an advantageous implementation, the fusion of the labels (i.e., fusion of the various segmentation estimates) for the brain structures and the vessel territories can be performed using majority voting (MV) label fusion. In MV label fusion, the final label assigned to a voxel of the input image is decided by a "majority vote" of all propagated labels for that voxel from the multiple atlas images. In an alternative implementation, another label fusion technique, such as the Stapler approach, can be used. The Stapler approach uses expectation maximization to iterate between the estimation of the true consensus segmentation and the estimation of reliability parameters for each of the raters. The reliability parameters are based on the sensitivity and specificity of each rater and are used to weigh their contributions when generating a consensus estimate.

In another exemplary embodiment, a single top ranked atlas image is selected in step 110 and the brain structures and vessel territories in the brain CT image are segmented using only the selected atlas image. In this case, the selected atlas image is registered to the brain CT image and the labeled brain structures and vessel territories in the selected atlas image are warped by the resulting deformation field. The warped labeled brain structures and vessel territories provide the segmentation of the brain structures and vessel territories in the brain CT image.

Returning to FIG. 1, at step 114, the segmentation results are output. In particular, the segmented brain structures and vessel territories in the brain CT image are output. The segmentation results can be output by displaying the segmentation results, for example on a display device of a computer system. It is also possible that the segmentation results be output by storing the segmentation results in a memory or storage of a computer system.

Figure 3:
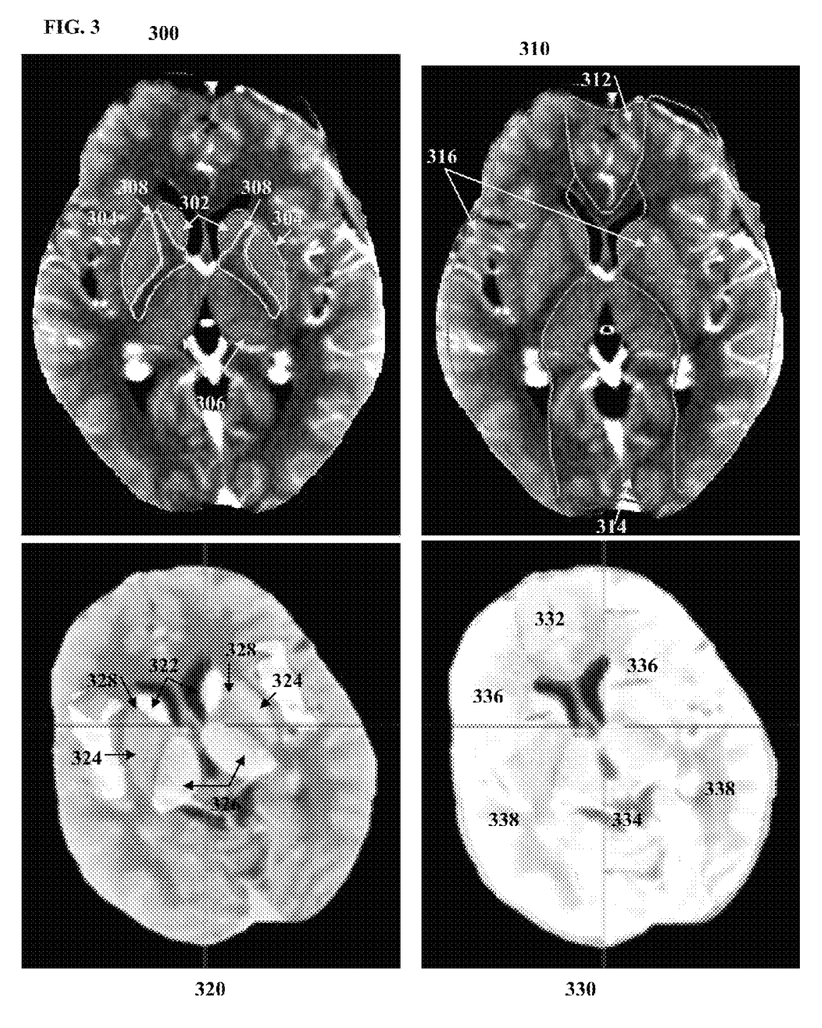
FIG. 3 illustrates results of segmenting brain structures and vessel territories in a brain CT image.
Figure 4:
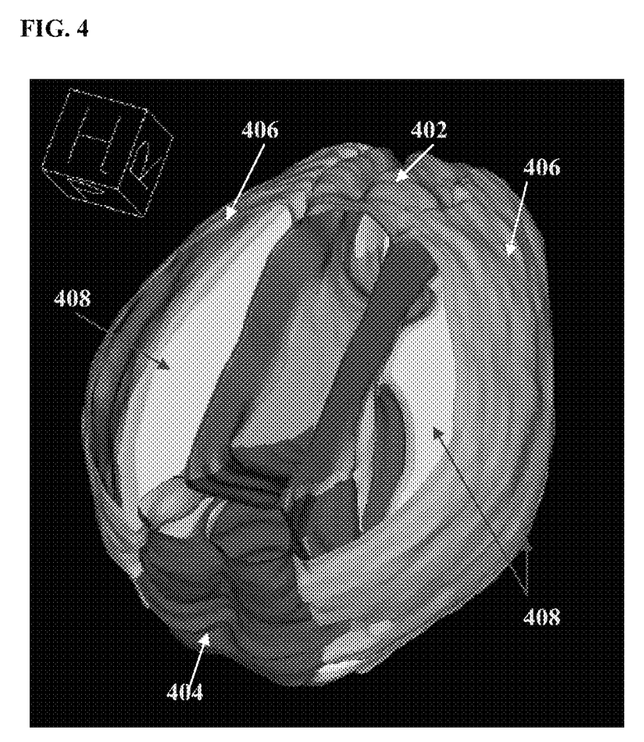
FIG. 4 illustrates exemplary vessel territory segmentation results in a 3D view.

FIG. 3 illustrates results of segmenting brain structures and vessel territories in a brain CT image. As shown in FIG. 3, images 300 and 310 show brain structure labels and vessel territory labels, respectively, in transverse slices of an exemplary atlas. Image 300 shows labeled brain structures in the atlas for the caudate 302, putamen 304, thalamus 306, internal capsule 308 on right and left sides of the brain. Image 310 shows labeled vessel territories in the atlas of the anterior cerebral artery (ACA) territory 312, the posterior cerebral artery (PCA) territory 314, and the superior middle cerebral artery (MCA) territory 316. The inferior MCA territory is also labeled in the atlas, but cannot be seen in image 310. Images 320 and 330 show segmentation results for the brain structures and the vessel territories, respectively, in transverse slices of an exemplary brain CT image. The segmentation results 320 and 330 were generated by warping the brain structure labels and vessel territory labels of the atlas shown in images 300 and 310, respectively. Image 320 shows segmented brain structures of the caudate 322, putamen 324, thalamus 326, internal capsule 328 on the right and left sides of the brain. Image 330 shows segmented vessel territories of the ACA territory 332, the PCA territory 334, the superior MCA territory 336, and the inferior MCA territory 338. FIG. 4 illustrates exemplary vessel territory segmentation results in a 3D view. As shown in FIG. 4, vessel territory segmentation results for the ACA territory 402, the PCA territory 404, the superior MCA territory 406, and the inferior MCA territory 408 are shown in the 3D view.

Figure 5:
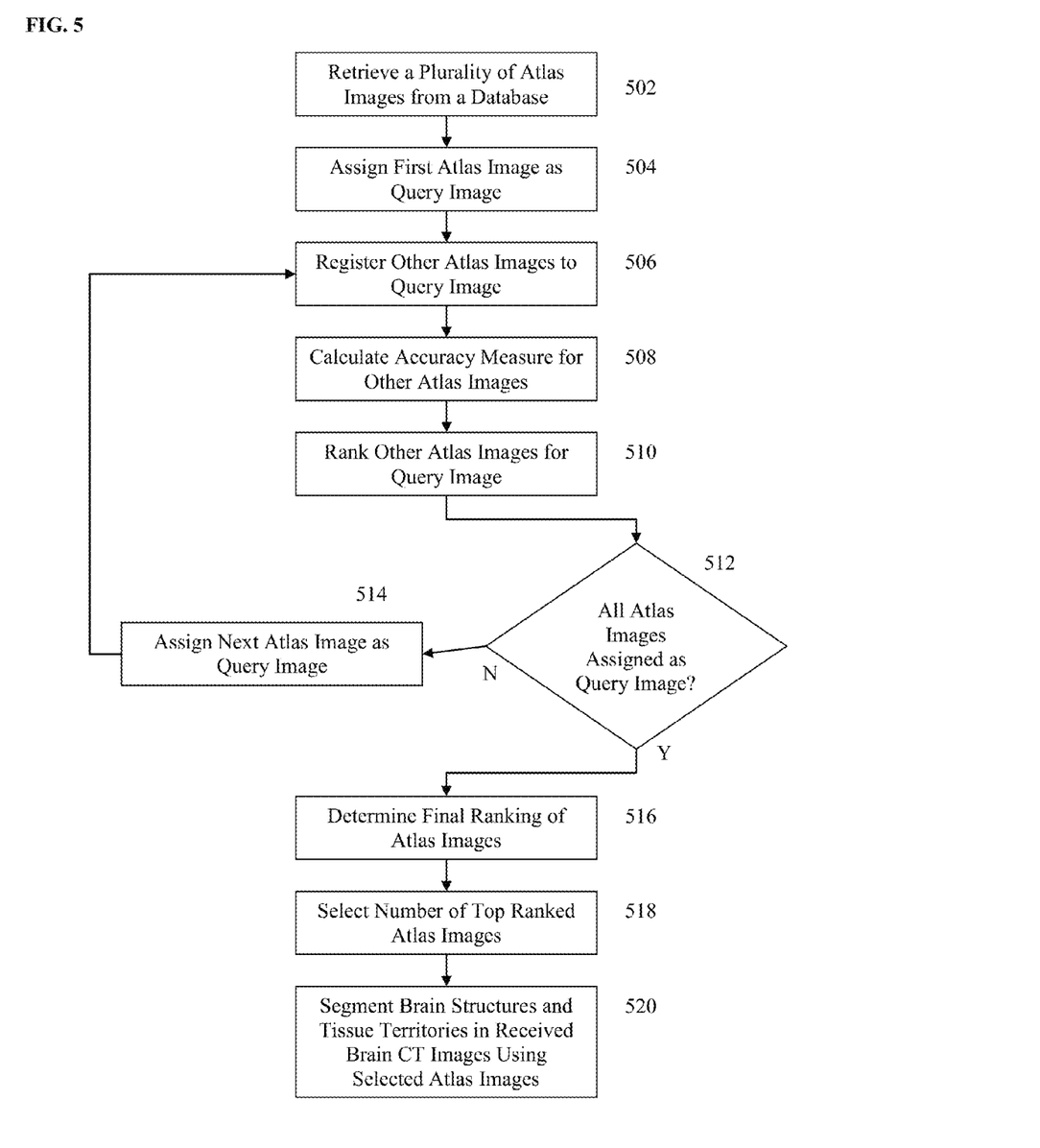
FIG. 5 illustrates a method for segmenting brain structures and tissue territories in brain CT images according to another embodiment of the present invention.

FIG. 5 illustrates a method for segmenting brain structures and tissue territories in brain CT images according to another embodiment of the present invention. As described above, the method of FIG. 1 utilizes an "online" atlas selection strategy that selects the best atlases to use to segment an input brain CT image based on image similarity information between the atlases and the input brain CT image. The method of FIG. 5 utilizes an "offline" atlas strategy that selects the best atlases to use to segment CT brain images based on the atlases available in a database. Accordingly, steps 502-518 of FIG. 5 can be performed offline prior to receiving any input CT brain image to be segmented. The method of FIG. 5 uses a leave-one-out cross validation procedure in which when one atlas image is chosen to act as a query image, the other atlas images are used as atlases to be registered to the query image.

Referring to FIG. 5, at step 502, a plurality of atlas images are retrieved from a database. At step 504, a first atlas image is assigned to be a query image. The query image serves as the image to be segmented by the other atlas images. At step 506, each of the atlas images other than the one assigned to be the query image is individually registered to the query image. This registration can be performed similar to the registration described in step 104 of FIG. 1. This registration warps each of the other atlas images to a space of the query image, resulting in a set of warped atlas images. At step 508, an accuracy measure is calculated for each of the atlas images other than the one assigned to be the query image. In particular, the accuracy measure for each atlas image is a measure of accuracy of the corresponding warped atlas image with respect to the query image. In a possible implementation, the accuracy measure for each atlas image may be estimated by calculating the SSD value between the corresponding warped atlas image and the query image within a ROI defined based on the brain structures in the warped atlas images, as described above in steps 106 and 108 of FIG. 1. In an alternative implementation, since the query image is one of the atlases retrieved from the database and the ground truth brain structure segmentations are known for the query image, the accuracy measure for each atlas image can be calculated by calculating an accuracy metric, such as the Dice similarity coefficient (DSC) or the Hausdorff distance (HD) between one or more of the brain structures in the corresponding warped atlas image and the ground truth brain structures in the query image. For example, a separate DSC or HD value can be calculated for each brain structure in each atlas image or a single DSC or HD value can be calculated for all of the brain structures in each atlas image.

At step 510, the atlas images other than the one assigned to be the query image are ranked for the current query image based on the accuracy measures calculated for the atlas images. The atlas images other than the one assigned to be the query image are ranked in order of their accuracy measures for the current query image, and a ranking of each of these atlas images for the current query image is stored. For example, when the SSD is used as the accuracy measure, the atlas images other than the one assigned to be he query image are ranked from a lowest SSD value to a highest SSD value. Since HD is also a difference measure, when using the HD value as the accuracy measure, the atlases are also ranked from a lowest value to a highest value. Since the DSC is a similarity measure, when the DSC is used as the accuracy measure, the atlas images other than the one assigned to be he query image are ranked from a highest DSC value to a lowest DSC value. The top ranked atlas image receives a ranking of 1 for the current query image and the bottom ranked atlas image receives a ranking of N-1, where N is the total number of atlas images (including the one assigned to be the current query image). In the case in which a separate accuracy metric (e.g., DSC) is calculated for each brain structure in each atlas image separate rankings of the atlas images from 1 to N-1 for the current query image can be determined for each of the brain structures.

At step 512, it is determined if all of the atlas images have been assigned to be the query image. If any atlas images have not yet been assigned to be the query image, the method proceeds to step 514. If all of the atlas images have been assigned to be the query image, the method proceeds to step 516. At step 514, the next atlas image in the plurality of atlas images is assigned to be the query image. The method then returns to step 506 and repeats steps 506-510 with the next atlas image as the query image. Accordingly, the method sequentially assigns each of the atlas images to be the query image and determines a ranking of the remaining atlas images for each query image. N-1 rankings are stored for each atlas image, each ranking corresponding to a ranking of that atlas image for the case in which a different one of the other atlas images is assigned as the query image. In the case in which separate rankings are determined for each of the brain structures for each query image, (N-1)*S rankings are stored for each atlas image, where S is the number of brain structures. At step 516, once all of the atlas images have been assigned to be the query image and steps 506-510 have been repeated for each query image, a final ranking of the atlas images is determined. In an exemplary implementation, a sum of the N-1 (or (N-1)*S) rankings stored for each atlas image is calculated, resulting in a ranking sum for each atlas images. The atlas images are then ranked in order based on their ranking sums, from lowest ranking sum to highest ranking sum. This final ranking of the atlas images corresponds to a selection priority of the atlas images. For example, the top ranked atlas image having the lowest ranking sum would be the first atlas image selected for performing segmentation.

Table 1, below, shows atlas rank results in an exemplary set of 18 brain CT atlases determined using the leave-one-out cross-validation procedure illustrated in steps 504-516 of FIG. 5. The set of atlases has 18 subjects in total, therefore each subject can be used as an atlas for the other 17 subjects, and be assigned an accuracy rank among other atlases used for each query. The row for each subject in Table 1 corresponds to the subject being used as an atlas, and the column for each subject in Table 1 corresponds to the subject being used as the query. For example, when subject 1 is used as an atlas for the query subject 2, the brain structure labels warped from subject 1 rank 12$^{th}$ among all atlases for subject 2. The "Rank sum Cau" column in Table 1 sums the ranks for the caudate for each atlas. The "Rank sum all" column in Table 1 shows the summed ranks of all of the structures for each atlas. The "Rank sum all" is sorted from lowest value to highest value to get the "Final rank" column. The "Atlas Priority" column lists the subjects in order of atlas priority, determined by the final ranking of the subjects.

TABLE 1

|   | Sub 1 | Sub 2 | Sub... | Sub 18 | Rank sum Cau | Rank sum all | Final rank | Atlas Priority |
|---|---|---|---|---|---|---|---|---|
| Sub 1 | NA | 12 | ... | 16 | 221 | 629 | 17 | Sub 18 |
| Sub 2 | 9 | NA | ... | 12 | 208 | 644 | 18 | Sub 17 |
| Sub 3 | 15 | 16 | ... | 11 | 188 | 542 | 14 | Sub 10 |
| Sub 4 | 11 | 11 | ... | 13 | 180 | 555 | 15 | Sub 8 |
| Sub 5 | 13 | 9 | ... | 6 | 142 | 465 | 9 | Sub 11 |
| Sub 6 | 17 | 8 | ... | 10 | 180 | 514 | 12 | Sub 9 |
| Sub 7 | 7 | 13 | ... | 5 | 151 | 429 | 7 | Sub 7 |
| Sub 8 | 2 | 7 | ... | 9 | 115 | 388 | 4 | Sub 16 |
| Sub 9 | 3 | 6 | NA | 2 | 139 | 425 | 6 | Sub 5 |
| Sub 10 | 10 | 14 | ... | 4 | 104 | 327 | 3 | Sub 13 |
| Sub 11 | 5 | 5 | ... | 1 | 117 | 424 | 5 | Sub 14 |
| Sub 12 | 8 | 3 | ... | 15 | 186 | 514 | 13 | Sub 6 |
| Sub 13 | 4 | 10 | ... | 8 | 161 | 469 | 10 | Sub 12 |
| Sub 14 | 16 | 4 | ... | 17 | 170 | 475 | 11 | Sub 2 |
| Sub 15 | 14 | 2 | ... | 7 | 186 | 591 | 16 | Sub 4 |
| Sub 16 | 6 | 17 | ... | 14 | 145 | 447 | 8 | Sub 15 |
| Sub 17 | 12 | 15 | ... | 3 | 96 | 238 | 2 | Sub 1 |
| Sub 18 | 1 | 1 | ... | NA | 65 | 186 | 1 | Sub 2 |

Returning to FIG. 5, at step 518 a number of top ranked atlas images are selected to be used for brain CT image segmentation. The number of atlas images selected may be a predetermined number of atlases to be used to perform multi-atlas segmentation using a particular label fusion technique. Assuming that the predetermined number of atlas images is n, the n top ranked atlas images are selected. If the atlas images are sorted based on selection priority, as shown in Table 1, the first n atlas images in the atlas priority list are selected. For example, for multi-atlas segmentation using majority voting (MV) label fusion, the predetermined number of atlas images selected may be five.

In an alternative implementation, the number of atlases to be selected may be actively determined for a particular segmentation technique using leave-one-out cross validation, in which various atlas images are treated as "test" images and segmentation is performed on the test images using varying numbers of the remaining atlas images. In this case, for each of a plurality of segmentations an additional atlas image is sequentially added in the order of their final ranking, and the segmentation results from the plurality of segmentations are compared to the ground truth brains structures in the "test" image using an accuracy metric, such as the Dice similarity coefficient (DSC) or the Hausdorff distance (HD). The number of atlases to be selected can be determined by analysis of the accuracy metric values resulting from the segmentations. For example, a number n can be chosen when a change in the accuracy metric values resulting from the segmentation using n atlases and the segmentation using n+1 atlases is less than a predetermined threshold. This indicates that the use of an additional atlas does not provide a significant increase in accuracy.

Figure 6:
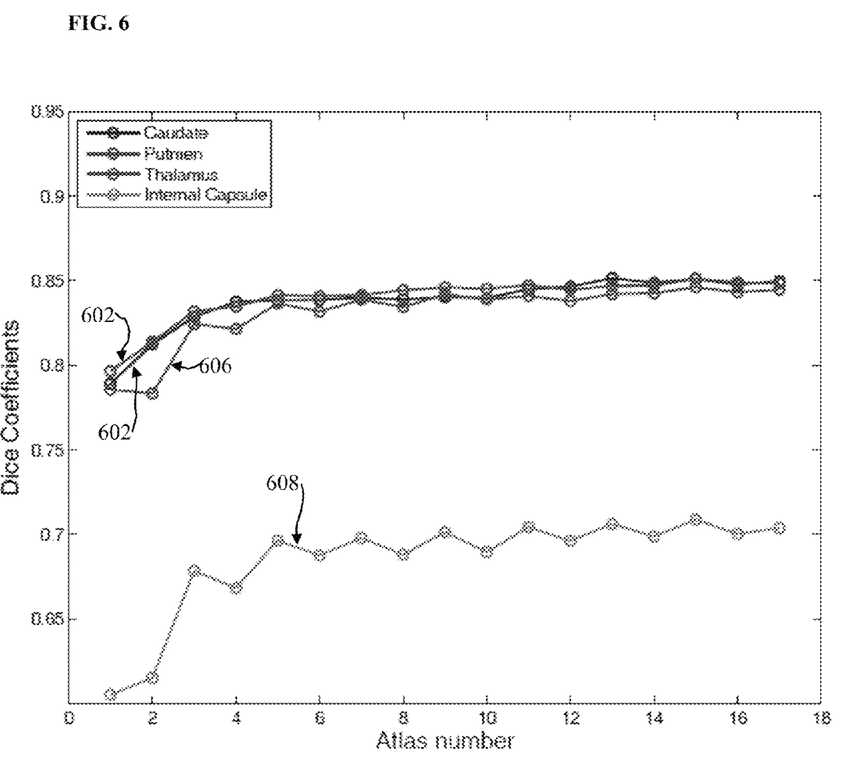
FIG. 6 illustrates trend curves of Dice similarity coefficients (DSC) of segmented brain structures using majority voting (MV) label fusion with increasing numbers of atlases.

FIG. 6 illustrates trend curves of DSC values of segmented brain structures using majority voting (MV) label fusion with increasing numbers of atlases. The vertical axis in FIG. 6 shows the average DCS value resulting from using each of a set of 18 brain atlases as a testing subject, and the horizontal axis shows the number of atlases used in the MV label fusion. The 18 atlases were ranked by the SSD criterion within the bounding box and added sequentially in the order they were ranked. For example, the top ranked atlas is selected if the "Atlas number" is 1, and the next top ranking atlas is added in sequence for each increasing "Atlas number". As shown in FIG. 6, average DSC values for the caudate 602, putamen 604, thalamus 606, and internal capsule 608 with respect to the number of atlases are shown. With the internal capsule excluded from the analysis, it can be seen that more atlases would not necessarily achieve better accuracy after a certain threshold. In particular, as shown in FIG. 6, the DSC values remain stable when the atlas number is greater than five.

Returning to FIG. 5, at step 520, brain structures and vessel territories are segmented in received brain CT images using the selected atlas images. In particular, once the atlas selection if performed offline in steps 502-518, the selected atlases are used to segment received brain CT images of patients. The segmentation using the selected atlases can be performed as described above in steps 112 and 114 of FIG. 1.

Figure 7:
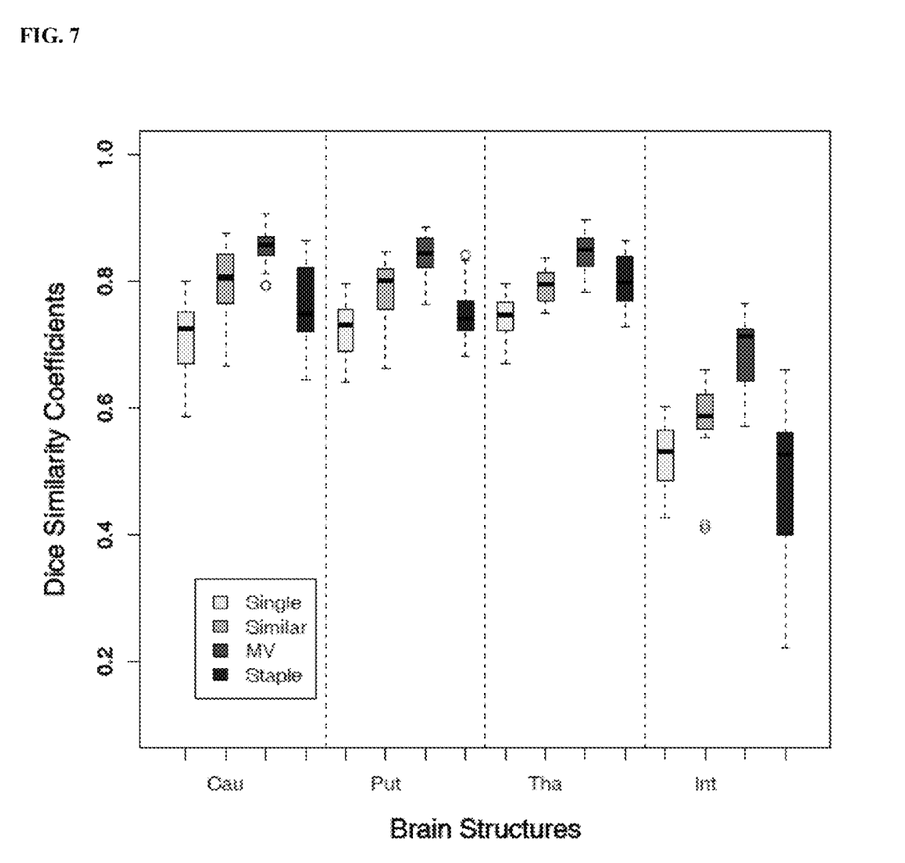
FIG. 7 illustrates box plots for Dice similarity coefficients (DSC) between ground truth and the segmented brain structures using all four label fusion strategies.

The present inventors compared several different fusion strategies, including single atlas, most similar atlas, major voting (MV), and Staple, using a set of 18 brain CT atlases. FIG. 7 illustrates box plots for Dice similarity coefficients (DSC) between ground truth and the segmented brain structures using all four label fusion strategies. Each box plot shows the distribution of DSC among all tested subjects through five-number summaries: the bottom and top of the box are the lower and upper quartiles, and the band near the middle of the box is the median. The ends of the whiskers represent within 1.5 inter-quartile range of the lower or upper quartile. Outliers are plotted with small circles. The box plot for "single" is made by statistics on all "leave-one-out" warped labels for all query subjects (each query subjects has 17 warped labels by single-atlas strategy). Among all four brain structures, the DSC for Internal Capsule is the worst. Among the four atlas fusion strategies, MV achieved the best segmentation accuracy. Similar is better than Single, while surprisingly Staple is much lower than MV and sometimes even lower than Similar.

Figure 8:
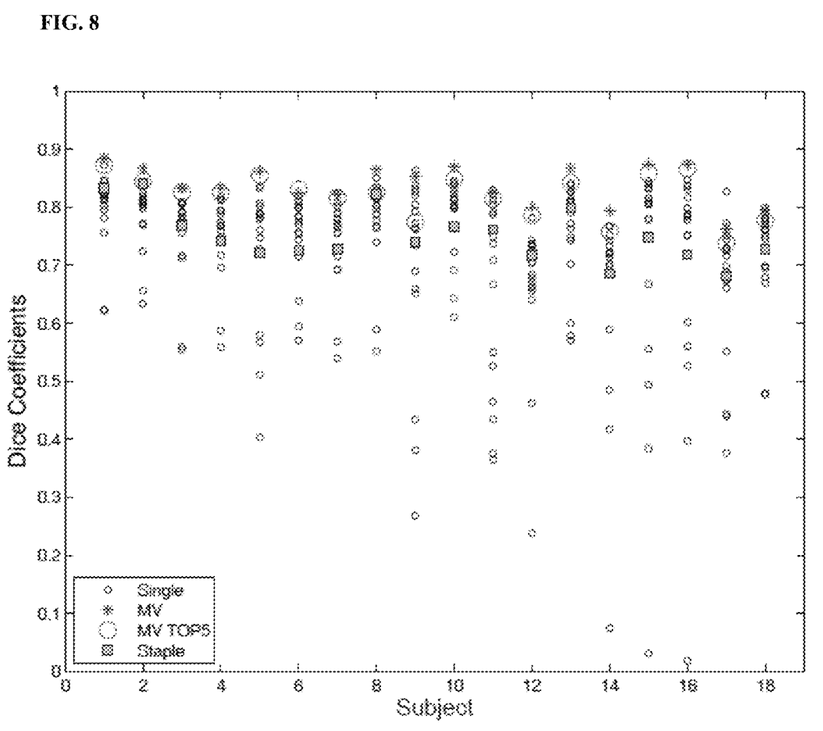
FIG. 8 illustrates the segmentation accuracy of the putamen brain structure for each of the 18 brain CT atlases when assigned to be the query subject.

FIG. 8 illustrates the segmentation accuracy of the putamen brain structure for each of the 18 brain CT atlases when assigned to be the query subject. In the leave-one-out cross-validation, small circles represent DSC values from single atlas, stars represents MV fusion with all 17 atlases, large circles represent MV fusion with top 5 ranked atlases from Table 1, and squares represent the Staple fusion strategy. It can be seen in FIG. 8 that the MV fusion performs better than Staple fusion for each subject, and the MV fusion using the top 5 ranked atlases achieves almost the same accuracy as MV fusion using the whole atlas set for most subjects. Table 2, below, summarizes the segmentation accuracy (mean±standard deviation) for five label fusion strategies including the derived "MV Top 5", for all brain structures. Each segmentation is validated through two metrics—Dice similarity coefficient (DSC) and Hausdorff Distance (HD). MV achieves best performance at around 0.85 DSC and less than 6 mm HD. "MV Top 5" shows its potential to be an accurate substitute MV fusion using the whole atlas set.

TABLE 2

|  |  | Candate | Putamen | Thalamus | Internal Capsule |
|---|---|---|---|---|---|
| Single | DSC | 0.71 ± 0.058 | 0.72 ± 0.049 | 0.74 ± 0.033 | 0.53 ± 0.050 |
|  | HD (mm) | 6.7 ± 2.9 | 10.2 ± 4.0 | 9.1 ± 1.4 | 16.5 ± 1.3 |
| Similar | DSC | 0.79 ± 0.059 | 0.78 ± 0.051 | 0.79 ± 0.026 | 0.58 ± 0.060 |
|  | HD (mm) | 5.0 ± 3.2 | 7.6 ± 4.6 | 8.0 ± 1.4 | 15.5 ± 3.5 |
| MV | DSC | 0.85 ± 0.032 | 0.84 ± 0.035 | 0.85 ± 0.030 | 0.69 ± 0.056 |
|  | HD (mm) | 3.7 ± 2.9 | 6.0 ± 3.9 | 5.9 ± 1.4 | 20.3 ± 5.5 |
| MV Top 5 | DSC | 0.82 ± 0.038 | 0.82 ± 0.039 | 0.82 ± 0.028 | 0.63 ± 0.031 |
|  | HD (mm) | 4.3 ± 2.9 | 7.5 ± 3.7 | 7.6 ± 0.9 | 21.6 ± 4.4 |
| Staple | DSC | 0.76 ± 0.066 | 0.75 ± 0.047 | 0.80 ± 0.042 | 0.49 ± 0.123 |
|  | HD (mm) | 5.2 ± 3.7 | 8.0 ± 4.9 | 6.8 ± 1.3 | 17.0 ± 3.3 |

Figure 9:
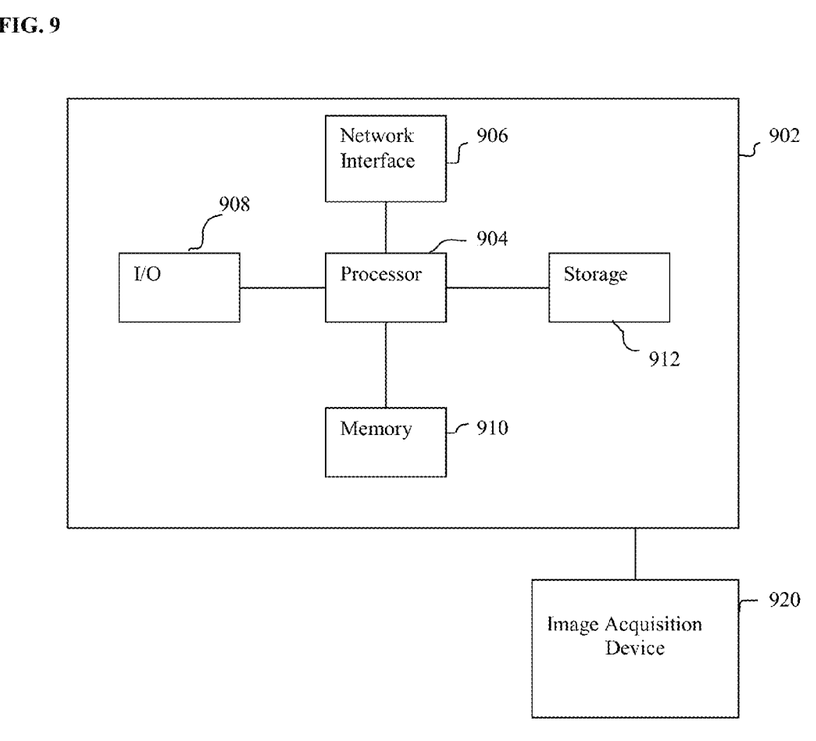
FIG. 9 is a high-level block diagram of a computer capable of implementing the present invention.

The above-described methods for atlas selection and segmentation of brain structures and vessel territories in CT image data can be implemented on a computer using well-known computer processors, memory units, storage devices, computer software, and other components. A high-level block diagram of such a computer is illustrated in FIG. 9. Computer 902 contains a processor 904, which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, the steps of the methods of FIGS. 1 and 5 may be defined by the computer program instructions stored in the memory 910 and/or storage 912 and controlled by the processor 904 executing the computer program instructions. An image acquisition device 920, such as a CT scanning device, can be connected to the computer 902 to input image data to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). Such input/output devices 908 may be used in conjunction with a set of computer programs as an annotation tool to annotate volumes received from the image acquisition device 920. One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting brain structures and vessel territories in a brain computed tomography (CT) image comprising:

receiving a brain CT image of a patient;

individually registering each of a plurality of atlas images to the brain CT image, resulting in a plurality of warped atlas images;

defining a region of interest in each of the plurality of warped atlas images based on labeled brain structures in each of the plurality of warped atlas images;

for each of the plurality of atlas images, calculating a respective sum of squared difference (SSD) value between a corresponding warped atlas image and the brain CT image within the respective region of interest defined for the corresponding warped atlas image;

selecting a number of the plurality atlas images based on the respective SSD value calculated for each of the plurality of atlas images; and segmenting brain structures and vessel territories in the brain CT image using the selected number of the plurality of atlas images.

2. The method of claim 1, wherein individually registering each of a plurality of atlas images to the brain CT image comprises:

individually registering each of the plurality of atlas images to the brain CT image at a reduced resolution.

3. The method of claim 2, wherein segmenting brain structures and vessel territories in the brain CT image using the selected number of the plurality of atlas images comprises:

registering the selected number of the plurality of atlas images to the brain CT image at an original resolution of the brain CT image.

4. The method of claim 1, wherein defining a region of interest in each of the plurality of warped atlas images based on labeled brain structures in each of the plurality of warped atlas images comprises:

defining a minimum bounding box in each of the plurality of warped atlas images that contains all of the labeled brain structures.

5. The method of claim 4, wherein the labeled brain structures include the caudate, putamen, thalamus, and internal capsule.

6. The method of claim 1, wherein selecting a number of the plurality atlas images based on the respective SSD value calculated for each of the plurality of atlas images comprises:

ranking the plurality of atlas images based on the respective SSD value from lowest SSD value to highest SSD value; and selecting a predetermined number of top ranked atlas images from the plurality of atlas images.

7. The method of claim 6, wherein selecting a predetermined number of top ranked atlas images from the plurality of atlas images comprises:

selecting the five top ranked atlas images from the plurality of atlas images.

8. The method of claim 6, wherein segmenting brain structures and vessel territories in the brain CT image using the selected number of the plurality of atlas images comprises:
segmenting the brain structures and vessel territories in the brain CT image by multi-atlas segmentation using only the selected predetermined number of top ranked atlas images.

9. The method of claim 8, wherein segmenting the brain structures and vessel territories in the brain CT image by multi-atlas segmentation using only the selected predetermined number of top ranked atlas images comprises:
registering each of the selected predetermined number of top ranked atlas images to the brain CT image; and
labeling the brain structures and vessel territories in the brain CT image by fusing labels from the registered predetermined number of top ranked atlas images using majority voting label fusion.

10. The method of claim 1, wherein selecting a number of the plurality atlas images based on the respective SSD value calculated for each of the plurality of atlas images comprises:
selecting an atlas image having a lowest SSD value from the plurality of atlas images.

11. The method of claim 10, wherein segmenting brain structures and vessel territories in the brain CT image using the selected number of the plurality of atlas images comprises:
segmenting the brain structures and vessel territories in the brain CT image using only the selected atlas image.

12. A method of segmenting brain structures and vessel territories in a brain computed tomography (CT) image, comprising:
retrieving a plurality of atlas images from a database;
sequentially assigning each of the plurality of atlas images to be a query image;
for each atlas image assigned to be the query image,
registering each of the remaining atlas images of the plurality of atlas images to the query image, resulting in a plurality of warped atlas images, and
ranking the remaining atlas images of the plurality of atlas images based on an accuracy measure calculated between the warped atlas image corresponding to each remaining atlas image and the query image;
determining a final ranking of the plurality of atlas images based on the rankings of the remaining atlas images for each atlas image assigned to be the query image;
selecting a number of top ranked atlas images from the plurality of atlas images based on the final ranking of the plurality of atlas images;
receiving a brain CT image of a patient; and
segmenting brain structures and vessel territories in the brain CT image by multi-atlas segmentation using the selected number of top ranked atlas images.

13. The method of claim 12, wherein ranking the remaining atlas images of the plurality of atlas images based on an accuracy measure calculated between the warped atlas image corresponding to each remaining atlas image and the query image comprises:
defining a respective region of interest in each warped atlas image based on labeled brain structures in each warped atlas image; and
calculating the SSD value between the warped atlas image corresponding to each remaining atlas image and the query image within the respective region of interest defined for the warped atlas image.

14. The method of claim 12, wherein ranking the remaining atlas images of the plurality of atlas images based on an accuracy measure calculated between the warped atlas image corresponding to each remaining atlas image and the query image comprises:
for each remaining atlas image, calculating an accuracy metric between one or more labeled brain structures in the corresponding warped atlas image and ground truth brain structures in the query image.

15. The method of claim 12, wherein selecting a number of top ranked atlas images from the plurality of atlas images based on the final ranking of the plurality of atlas images comprises:
performing a plurality of test segmentations with the plurality of atlas images using leave-one-out cross-validation, the plurality of test segmentations performed using multi-atlas segmentation with a varying number of atlases;
calculating accuracy values between brain structures segmented in the plurality of test segmentations and corresponding ground truth brain structures;
determining a number n of atlases to be selected based on the accuracy values, such that a change in average accuracy values resulting from test segmentations using n atlases and test segmentations using n+1 atlases is less than a predetermined threshold;
selecting n top ranked atlas images from the plurality of atlas images.

16. The method of claim 12, wherein segmenting brain structures and vessel territories in the brain CT image by multi-atlas segmentation using the selected number of top ranked atlas images comprises:
registering each of the selected number of top ranked atlas images to the brain CT image; and
labeling the brain structures and vessel territories in the brain CT image by fusing labels from the registered atlas images using majority voting label fusion.

17. An apparatus for segmenting brain structures and vessel territories in a brain computed tomography (CT) image comprising:
means for individually registering each of a plurality of atlas images to a brain CT image, resulting in a plurality of warped atlas images;
means for defining a region of interest in each of the plurality of warped atlas images based on labeled brain structures in each of the plurality of warped atlas images;
means for calculating, for each of the plurality of atlas images, a respective sum of squared difference (SSD) value between a corresponding warped atlas image and the brain CT image within the respective region of interest defined for the corresponding warped atlas image;
means for selecting a number of the plurality atlas images based on the respective SSD value calculated for each of the plurality of atlas images; and
means for segmenting brain structures and vessel territories in the brain CT image using the selected number of the plurality of atlas images.

18. The apparatus of claim 17, wherein the means for selecting a number of the plurality atlas images based on the respective SSD value calculated for each of the plurality of atlas images comprises:
means for ranking the plurality of atlas images based on the respective SSD value from lowest SSD value to highest SSD value; and
means for selecting a predetermined number of top ranked atlas images from the plurality of atlas images.

19. The apparatus of claim 18, wherein the means for segmenting brain structures and vessel territories in the brain CT image using the selected number of the plurality of atlas images comprises:
   means for segmenting the brain structures and vessel territories in the brain CT image by multi-atlas segmentation using only the selected predetermined number of top ranked atlas images.

20. The apparatus of claim 19, wherein the means for segmenting the brain structures and vessel territories in the brain CT image by multi-atlas segmentation using only the selected predetermined number of top ranked atlas images comprises:
   means for registering each of the selected predetermined number of top ranked atlas images to the brain CT image; and
   means for labeling the brain structures and vessel territories in the brain CT image by fusing labels from the registered predetermined number of top ranked atlas images using majority voting label fusion.

21. The apparatus of claim 17, wherein the means for selecting a number of the plurality atlas images based on the respective SSD value calculated for each of the plurality of atlas images comprises:
   means for selecting an atlas image having a lowest SSD value from the plurality of atlas images.

22. The apparatus of claim 21, wherein the means for segmenting brain structures and vessel territories in the brain CT image using the selected number of the plurality of atlas images comprises:
   means for segmenting the brain structures and vessel territories in the brain CT image using only the selected atlas image.

23. A non-transitory computer readable medium storing computer program instructions for segmenting brain structures and vessel territories in a brain computed tomography (CT) image, the computer program instructions when executed on a processor cause the processor to perform operations comprising:
   individually registering each of a plurality of atlas images to a brain CT image, resulting in a plurality of warped atlas images;
   defining a region of interest in each of the plurality of warped atlas images based on labeled brain structures in each of the plurality of warped atlas images;
   for each of the plurality of atlas images, calculating a respective sum of squared difference (SSD) value between a corresponding warped atlas image and the brain CT image within the respective region of interest defined for the corresponding warped atlas image;
   selecting a number of the plurality atlas images based on the respective SSD value calculated for each of the plurality of atlas images; and
   segmenting brain structures and vessel territories in the brain CT image using the selected number of the plurality of atlas images.

24. The non-transitory computer readable medium of claim 23, wherein selecting a number of the plurality atlas images based on the respective SSD value calculated for each of the plurality of atlas images comprises:
   ranking the plurality of atlas images based on the respective SSD value from lowest SSD value to highest SSD value; and
   selecting a predetermined number of top ranked atlas images from the plurality of atlas images.

25. The non-transitory computer readable medium of claim 24, wherein segmenting brain structures and vessel territories in the brain CT image using the selected number of the plurality of atlas images comprises:
   segmenting the brain structures and vessel territories in the brain CT image by multi-atlas segmentation using only the selected predetermined number of top ranked atlas images.

26. The non-transitory computer readable medium of claim 25, wherein segmenting the brain structures and vessel territories in the brain CT image by multi-atlas segmentation using only the selected predetermined number of top ranked atlas images comprises:
   registering each of the selected predetermined number of top ranked atlas images to the brain CT image; and
   labeling the brain structures and vessel territories in the brain CT image by fusing labels from the registered predetermined number of top ranked atlas images using majority voting label fusion.

27. The non-transitory computer readable medium of claim 23, wherein selecting a number of the plurality atlas images based on the respective SSD value calculated for each of the plurality of atlas images comprises:
   selecting an atlas image having a lowest SSD value from the plurality of atlas images.

28. The non-transitory computer readable medium of claim 27, wherein segmenting brain structures and vessel territories in the brain CT image using the selected number of the plurality of atlas images comprises:
   segmenting the brain structures and vessel territories in the brain CT image using only the selected atlas image.

* * * * *